United States Patent [19]

Stephens et al.

[11] Patent Number: 5,228,900
[45] Date of Patent: Jul. 20, 1993

[54] AGGLOMERATION OF PARTICULATE MATERIALS WITH RETICULATED CELLULOSE

[75] Inventors: R. Scott Stephens, Auburn; John A. Westland, Bothell, both of Wash.; Douglas R. Shaw, Salt Lake City, Utah

[73] Assignee: Weyerhaeuser Company, Tacoma, Wash.

[21] Appl. No.: 799,680

[22] Filed: Nov. 21, 1991

Related U.S. Application Data

[63] Continuation-in-part of Ser. No. 513,352, Apr. 20, 1990.

[51] Int. Cl.⁵ ................................................ C21C 7/02
[52] U.S. Cl. .......................................................... 75/303
[58] Field of Search ............................................. 75/303

[56] References Cited

U.S. PATENT DOCUMENTS

| | | | |
|---|---|---|---|
| 2,865,731 | 12/1958 | Crowe | 75/321 |
| 4,374,702 | 2/1983 | Turbak et al. | 162/101 |
| 4,378,431 | 3/1983 | Brown, Jr. | 435/101 |
| 4,919,711 | 4/1990 | Banyai | 75/321 |
| 4,929,550 | 5/1990 | Byrom | 435/101 |
| 4,948,430 | 8/1990 | Banyai | 75/321 |

FOREIGN PATENT DOCUMENTS

| | | |
|---|---|---|
| 0186495 | 7/1986 | European Pat. Off. |
| 0206830 | 12/1986 | European Pat. Off. |
| 0212289 | 3/1987 | European Pat. Off. |
| 0228779 | 7/1987 | European Pat. Off. |
| 61-212295 | 9/1986 | Japan |
| 61-215635 | 9/1986 | Japan |
| 61-221201 | 10/1986 | Japan |
| 8911783 | 12/1989 | PCT Int'l Appl. |
| 8912107 | 12/1989 | PCT Int'l Appl. |
| 1570487 | 7/1980 | United Kingdom |

OTHER PUBLICATIONS

A. F. Turbak, et al., Microfibrillated Cellulose, A New Cellulose Product: Properties, Uses and Commercial Potential, Journal of Applied Polymer Science Applied Polymer Symposium 37,815 (1983).

H. Yokota, et al., Microfibrillated Substances and Their Application for Cellulose, Chitin and Chitosan, 1987 Inter. Dissolving Pulps Conference.

*Primary Examiner*—Peter D. Rosenberg
*Attorney, Agent, or Firm*—Stoel, Rives, Boley, Jones & Grey

[57] ABSTRACT

Particulate materials, particularly fine particles of clay animal litter, are agglomerated using a reticulated cellulose product formed by growing Acetobacter. Treatment with such reticulated cellulose also enhances the liquid absorbency of particulate materials.

21 Claims, 3 Drawing Sheets

AGGLOMERATION OF PARTICULATE MATERIALS WITH RETICULATED CELLULOSE

RELATED APPLICATION

This application is a continuation-in-part of U.S. patent application Ser. No. 07/513,352 filed Apr. 20, 1990.

BACKGROUND OF THE INVENTION

This invention relates to methods for agglomerating or binding fine materials or particles to provide agglomerated particles having structural integrity, and to methods for producing agglomerated particulate materials with high liquid absorbencies. "Agglomerating" or "Agglomeration" means consolidating fine materials to form larger intact particles, and thereby substantially changing the size distribution of particles from very fine to coarse. Through the process of agglomeration using agglomerating agents that increase in liquid absorbency of material, the material's utility or desirable qualities are significantly increased.

It would be beneficial if there was some method of agglomerating or binding the fines produced during processing of commodity granule products to provide additional useful product. Particularly helpful would be a method to provide an agglomerated product that has properties similar to the commodity granule products from which the fines were separated.

In the manufacture of granular commodity materials, such as clay animal litter and flour, "dusts" or "fines" are created as an undesired byproduct. These "dusts" or "fines" also include various materials such as metal, metal ore particles and fly ash. When handling such materials in bulk, their dusts can become sources of airborne pollution as well as creating problems in the production of a saleable product. Therefore, these fines create handling problems as well as waste products which cannot be adapted for granular commodity materials. In addition, combustible dusts, such as flour, can be explosive when suspended in a confined air space; and, it may be necessary to continuously filter or scrub the air to prevent combustion.

The grinding of clay ore, to make clay animal litter of a useful particle size distribution, can result in the generation of significant amounts (e.g. 5 wt. percent) of very fine material. The presence of such dust particles annoys consumers, so the dust must be removed in order to make a commercially acceptable product. Typically, the separated clay dust has no commercial value and must be disposed of in a landfill or otherwise.

To be useful as animal litter, particles of agglomerated clay dust would need to have a high degree of liquid absorbency. Other properties, such as wet strength, should equal or exceed those of standard clay litter particles. To date, there has been no successful method of agglomerating clay dust or other particulate materials to form larger particles having a high degree of structural integrity, high wet strength, and an enhanced capacity to absorb liquids.

Ceramics require binders, which are green strength organic materials, to form the ceramic products. These green strength materials aid in process handling, including maintaining the shape or structure of the ceramics before firing.

It would also be useful to have a method for increasing the liquid absorbency of existing particulate materials. Highly liquid absorbent particles are useful in cleaning up spilled liquids such as petroleum products and hazardous substances. The absorbent particles should have the ability to absorb the liquids and still maintain their integrity.

Also, it has been known for many years that cellulose can be synthesized by certain bacteria, particularly those of the genus Acetobacter. But, neither this type of cellulose, nor any other, has been recognized as serving a role in agglomerating fine particles or in increasing the liquid absorbency of existing particulate materials.

It has been known for many years that cellulose can be synthesized by certain bacteria, particularly those of the genus Acetobacter. However, taxonomists have been unable to agree upon a consistent classification of the cellulose producing species of Acetobacter. For example, the cellulose producing microorganisms listed in the 15th Edition of the Catalog of the American Type Culture Collection under accession numbers 10245, 10821 and 23769 are classified both as *Acetobacter aceti subsp. xylinum* and as *Acetobacter pasteurianus*. For the purposes of the present invention any species or variety of bacterium within the genus Acetobacter that will produce cellulose under agitated conditions should be regarded as a suitable cellulose producer.

The cellulose fibrils produced by Acetobacter, although chemically resembling, in many aspects, cellulose produced from wood pulp, are different in a number of respects. Chief among the differences is the cross sectional width of these fibrils. The cellulose fibrils produced by Acetobacter are greater than two orders of magnitude narrower than the cellulose fibers typically produced by pulping birch or pine wood. The small cross sectional size of these Acetobacter-produced fibrils, together with the concomitantly greater surface area than conventional wood-pulp cellulose and the inherent hydrophilicity of cellulose, leads to a cellulose product having unusually great capacity for absorbing aqueous solutions.

This capacity for high absorbency has been demonstrated to be useful in the manufacture of dressings which may be used in the treatment of burns or as surgical dressings to prevent exposed organs from surface drying during extended surgical procedures. Such uses and a variety of medicament impregnated pads made by treatment of Acetobacter-produced intact pellicles are disclosed in U.S. Pat. No. 4,788,146.

The pellicles of U.S. Pat. No. 4,788,146 are produced by growing Acetobacter in a culture medium tray which remains motionless. Acetobacter is normally cultured under such static conditions with the cellulose microfibrils being produced at the air medium interface. Most bacteria of this genus are very poor cellulose producers when grown in agitated culture. One reason proposed for such poor production is that an agitated culture induces a tendency for reversion to noncellulose producing strains.

However, certain Acetobacter strains are characterized by an ability to produce large amounts of a reticulated bacterial cellulose in agitated culture without manifesting instability leading to loss of cellulose production in culture. European Patent Application No. 86308092.5 and U.S. Pat. No. 4,863,565 disclose Acetobacter varieties which are vigorous cellulose producers under agitated culture conditions. The reticulated cellulose produced by the disclosed microorganisms and culture conditions appears to be a unique type, physically quite different from other known bacterial cellulose. It has a highly branched, three dimensional, reticulated structure. A normal cellulose pellicle tends to have a lamellar structure with significantly less branching.

SUMMARY OF THE INVENTION

It has now been discovered that fine particles, such as the dust produced when grinding clay ore, can be mixed with reticulated cellulose, which serves as an agglomerator to form agglomerated particles of a commercially useful size. This agglomeration method produces particles which have a high degree of structural integrity and significant wet and dry strength.

Fines of various commodity materials can be agglomerated, and particulate materials can be made more liquid absorbent according to the processes of the present invention.

Commodity materials include any inorganic or organic materials that exist in powdered or granular form and that would benefit from agglomeration to produce particles of an increased size or from an enhancement in liquid absorbency. Examples of such materials include clay ore, particles used in ceramics manufacture, metal and metal ore particles, coal dust, fly ash, carbon particles, and ingredients for pharmaceutical tablets.

An additional example is the use of the reticulated bacterial cellulose in the food industry to increase the integrity of certain food products that may suffer from undesirable degradation or failure to hold its shape in storage, handling or cooking, such as packaged pasta products.

A further example is the use of reticulated bacterial cellulose in the mineral processing industry as a means of agglomerating fine particles in connection with heap leaching. The presence of fine particulate materials such as slit, clay, and ore fines associated with metal ores (referred to hereafter as "associated fines") being treated frequently interferes with heap leaching processes in which a chemical leaching solution is percolated through an admixture of metal ore particles and associated fines. It is important in heap leaching processes to maintain continuous percolation of the leaching solution through metal ores and associated fines to enhance recovery of dissolved metallic values. Particle disintegration resulting from contact with the leaching solution and liquid absorption by associated fines frequently result in the generation of impermeable zones where percolation is inhibited or arrested entirely.

Agglomeration of the metallic ore particles and/or associated fines with reticulated cellulose according to the present invention produces larger particles having structural integrity that are permeable to the leaching solution and assist in maintaining continuous percolation through the metallic ore particles and associated fines. Reticulated cellulose helps preserve the integrity of the agglomerated fine material during the heap leaching process. Reticulated cellulose may be substituted for known binders, such as cement, in heap leaching.

Only a small amount of reticulated cellulose need be used so that particles of the agglomerated dust or fines have physical characteristics that are comparable to the characteristics of similarly sized or larger nonagglomerated particles of the same commodity. And, in some instances, the agglomerated particles have improved characteristics.

It has also been found that existing particulate materials, such as commercially available clay particles, can be treated with reticulated cellulose to obtain particles of enhanced aqueous and non-aqueous liquid absorbency.

In some embodiments, it is an object of this invention to agglomerate fine particles so as to avoid dusting problems or to produce a useable product from the fine particles. And, in some embodiments, it is an object to produce a particulate material with improved liquid absorbency.

These and other objects and features of the invention will be understood from the following description.

DETAILED DESCRIPTION

Figure 1:
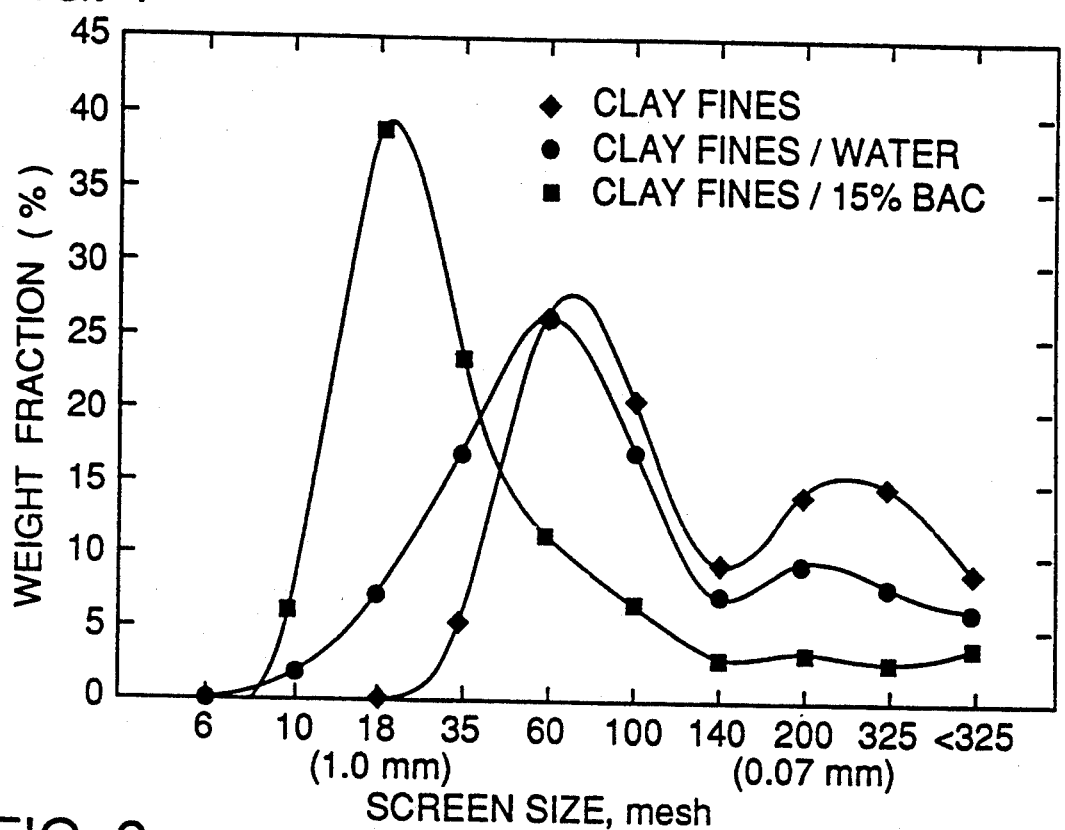
FIG. 1 is a graph showing the particle size distribution for untreated clay fines and for clay fines treated with water only or treated with reticulated cellulose.

Preferred methods for agglomerating or increasing the absorbency of materials are explained in this detailed description.

EXAMPLE 1

Production of Reticulated Bacterial Cellulose

For the purpose of this disclosure, "reticulated cellulose" and "BAC" refer to any cellulose material that has similar characteristics to cellulose produced by growing the Acetobacter strain of ATCC Accession No. 53263 or No. 53524 by the method described below. Such reticulated cellulose is characterized by a three-dimensional, multiple branching fiber structure such that the fibers do not have recognizable "ends". In particular, the structure has strands of cellulose that interconnect forming a grid-like pattern extending in three dimensions. Unlike some bacterial cellulose which has overlapping adjacent strands of cellulose that are oriented predominantly with the long axis of the strand in parallel but disorganized planes (thereinafter described as "non-reticulated cellulose"), the structure of reticulated cellulose has interconnecting, rather than overlapping, strands of cellulose. These interconnecting strands have both roughly perpendicular, as well as roughly parallel, orientations. As a result, the reticulated cellulose product has a more generally fenestrated appearance in scanning electron micrographs, whereas non-reticulated cellulose has an appearance in scanning electron micrographs of strands piled on top of one another in a crisscrossing fashion, but frequently parallel in any given layer. The fibrils of non-reticulated cellulose, as compared to the fibrils of the reticulated product, appear to branch and interconnect less frequently. Although the non-reticulated cellulose product appears to have many fibrils that contact one another, the fibrils overlay one another rather than interconnect. By contrast, fibrils of reticulated cellulose have a large proportion of fibers that interconnect to form a substantially continuous network of interconnecting fibers.

Bacterial cellulose for the present invention was produced in agitated culture by a strain of *Acetobacter aceti* var. xylinum grown as a subculture of ATCC Accession No. 53263, deposited Sep. 13, 1985 or ATCC Accession No. 53524, deposited on Jul. 25, 1986 under the terms of the Budapest Treaty.

The following base medium was used for all cultures. This will be referred to henceforth as CSL medium.

| Ingredient | Final Conc. (mM) |
| --- | --- |
| $(NH_4)_2SO_4$ | 25 |
| $KH_2PO_4$ | 7.3 |
| $MgSO_4$ | 1.0 |
| $FeSO_4$ | 0.013 |
| $CaCl_2$ | 0.10 |
| $Na_2MoO_4$ | 0.001 |
| $ZnSO_4$ | 0.006 |
| $MnSO_4$ | 0.006 |
| $CuSO_4$ | 0.0002 |
| Vitamin mix | 10 mL/L |
| Carbon source | As later specified (usually glucose 2 or 4% w/v) |
| Corn Steep liquor (supernatant fraction after centrifugation) | As later specified (usually 5%, v/v) |
| Antifoam | 0.01 percent (v/v) |

The final pH of the medium was 5.0 ± 0.2.

The vitamin mix was formulated as follows:

| Ingredient | Conc. mg/L |
| --- | --- |
| Inositol | 200 |
| Niacin | 40 |
| Pyridoxine HCl | 40 |
| Thiamine HCl | 40 |
| Ca Pantothenate | 40 |
| Riboflavin | 20 |
| p-Aminobenzoic acid | 20 |
| Folic acid | 0.2 |
| Biotin | 0.2 |

Corn steep liquor (CSL) varies in composition depending on the supplier and mode of treatment. A product obtained as Lot E804 from Corn Products Unit, CPC North America, Stockton, Calif. may be considered typical and is described as follows:

| Major Component | Percent |
| --- | --- |
| Solids | 43.8 |
| Crude protein | 18.4 |
| Fat | 0.5 |
| Crude fiber | 0.1 |
| Ash | 6.9 |
| Calcium | 0.02 |
| Phosphorus | 1.3 |
| Nitrogen-free extract | 17.8 |
| Non-protein nitrogen | 1.4 |
| NaCl | 0.5 |
| Potassium | 1.8 |
| Reducing sugars (as dextrose) | 2.9 |
| Starch | 1.6 |

The pH of the above is about 4.5.

The bacteria were first multiplied as a pre-seed culture using CSL medium with 4 percent (w/v) glucose as the carbon source and 5 percent (w/v) CSL. Cultures were grown in 100 mL of the medium in a 750 mL Falcon No. 3028 tissue culture flask at 30° C. for 48 hours. The entire contents of the culture flask was blended and used to make a 5 percent (v/v) inoculum of the seed culture. Preseeds were streaked on culture plates to check for homogeneity and possible contamination.

Seed cultures were grown in 400 mL of the above-described medium in 2 L baffled flasks in a reciprocal shaker at 125 rpm at 30° C. for two days. Seed cultures were blended and streaked as before to check for contamination before further use.

Bacterial cellulose was initially made in a continuously stirred 14 L Chemap fermenter using a 12 L culture volume inoculated with 5 percent (v/v) of the seed cultures. An initial glucose concentration of 32 g/L in the medium was supplemented during the 72-hour fermenter run with an additional 143 g/L added intermittently during the run. In similar fashion, the initial 2 percent (v/v) CSL concentration was augmented by the addition of an amount equivalent to 2 percent by volume of the initial volume at 32 hours and 59 hours. Cellulose concentration reached about 12.7 g/L during the fermentation. Throughout the fermentation, dissolved oxygen was maintained at about 30 percent air saturation.

Following fermentation, the cellulose was allowed to settle and the supernatant liquid poured off. The remaining cellulose was washed with deionized water and then extracted with 0.5M NaOH solution at 60° C. for two hours. After extraction, the cellulose was again washed with deionized water to remove residual alkali and bacterial cells. More recent work has shown that 0.1M NaOH solution is entirely adequate for the extraction step. The purified cellulose was maintained in wet condition for further use. This material was readily dispersible in water to form a uniform slurry.

Bacterial cellulose for the later examples was made in 250 L and 6000 L fermenters.

The bacterial cellulose produced under stirred or agitated conditions, as described above, has a microstructure quite different from that produced in conventional static cultures. It is a reticulated product formed by a substantially continuous network of branching interconnected cellulose fibers.

The bacterial cellulose prepared as above by the agitated fermentation has filament widths much smaller than softwood pulp fibers or cotton fiber. Typically these filaments will be about 0.1 to 0.2 microns in width with indefinite length due to the continuous network structure. A softwood fiber averages about 30 microns in width and 2 to 5 mm in length while a cotton fiber is about 15 microns in width and about 25 mm long.

EXAMPLE 2

Agglomeration of Clay

In the manufacturing of clay animal litter, calcined clay ore is ground into particles of a suitable average size. The particles should be sufficiently small as to provide the surface area needed for rapid absorption of liquids. Additionally, the particles should not be so small that they constitute an irritating dust.

Present clay grinding techniques are imprecise, however, so a substantial amount of fine particles are almost always formed as an undesired byproduct. "Fine" particles, in the context of calcined clay ore, means particles having a particle size distribution wherein the majority of particles have an effective particle size of about 250 microns or less and pass through a standard Tyler 60 mesh screen. The degree of grinding needed to obtain litter particles of sufficient surface area also produces a significant fraction of particles which are smaller than desirable. Before a clay litter product is sold, the undersize particles or "fines" are screened out and must be disposed of in an environmentally acceptable manner.

Such clay fines can be agglomerated into usefully-sized litter particles by combining the fines with reticulated cellulose of the type described in Example 1. Typically, the clay fines will be mixed with an aqueous slurry of reticulated cellulose, there being sufficient water to facilitate mixing. Reticulated cellulose should be allowed to retain sufficient water, at least 50 wt. percent, so that it can be mixed directly with clay fines in most instances. Make-up water can be added as needed to form a blendable slurry. The reticulated cellulose can comprise as little as 0.5 wt. percent of the total solids in the slurry. The mixing may be low shear (e.g. hand mixing) or high shear to blend the mixture.

After mixing, water is removed from the slurry. Preferably, water is first removed with a screw press or other mechanical dewatering apparatus. Drying then can be completed in an oven at elevated temperature.

After drying, the agglomerated product is ground in a mechanical mill and thereafter screened to separate any residual fines. The separated fines can be recycled to the slurry-forming stage of the agglomeration process.

Calcined clay dust was obtained from Edward Lowe Industries, Inc. of Maricopa, Calif. The dust, which is a waste product of animal litter manufacturing, was combined with aqueous reticulated cellulose. The combined materials were mixed for 5 minutes, and the resulting mixture filtered through sharkskin filter paper to remove a portion of the water, if necessary. The remaining solid material was removed from the filter, pressed at 3000 psi between blotter boards to further dewater the sample, and oven dried for 12 hours at 105° C. until substantially dry. The dried material was broken up in a Wiley mill fitted with a 6 mm screen to provide particles of a size suitable for use as litter material.

As shown in Table I, the use of reticulated cellulose increased the size of particles through agglomeration.

TABLE I

Clay Treatment and Resulting Properties

| Run No. | Reticulated Cellulose (dry wt. percent)[1] | Water (g/g Clay) | Blending Method | Fraction >250 μm (percent) | Hardness (lbf) |
| --- | --- | --- | --- | --- | --- |
| 1 | -0- | -0- | None | 32.4 | 0[5] |
| 2 | -0- | 17.6 | Hand mix[2] | 55.3 | 8.6 |
| 3 | -0- | 10.0 | Waring[3] | 59.4 | 8.0 |
| 4 | 0.1 | 0.66 | Hand mix | 55.1 | ND[6] |
| 5 | 0.1 | 1.3 | Waring | 54.1 | ND |
| 6 | 0.5 | 0.73 | Hand mix | 57.3 | ND |
| 7 | 0.5 | 6.0 | Waring | 68.1 | ND |
| 8 | 0.5 | 4.9 | Low[4] | 58.0 | ND |
| 9 | 1.0 | 0.82 | Hand mix | 61.1 | 8.9 |
| 10 | 1.2 | 2.7 | Waring | 73.3 | 9.2 |
| 11 | 5.0 | 0.89 | Hand mix | 66.6 | ND |
| 12 | 5.0 | 10.0 | Waring | 73.2 | 9.6 |
| 13 | 5.0 | 10.5 | Low | 74.3 | ND |
| 14 | 5.6 | 11.8 | Waring | 79.6 | ND |
| 15 | 10.0 | 1.9 | Hand mix | 75.8 | Deformed |
| 16 | 10.5 | 18.7 | Waring | 83.5 | 9.6 |
| 17 | 15.0 | 17.7 | Hand mix | 82.2 | Deformed |
| 18 | 15.0 | 28.1 | Waring | 82.4 | 9.4 |
| 19 | 15.0 | 35.1 | Low | 82.8 | ND |

[1]Dry weight percent based on ratio to the amount of clay.
[2]Stirred with spatula for 5 minutes.
[3]Medium speed on 3-speed Waring blender.
[4]Propeller mixer.
[5]Tablet could not be formed.
[6]ND = Not Determined.

Uncomminuted particles of clay had a hardness, as measured by a tablet hardness tester (Pfizer Tablet Hardness Tester, Pfizer, Inc.-Chemical Division, manufactured by Testing Machines, Inc., Amityville NY) of 10.6 lbf (pounds force). As shown in Run 1, clay fines alone were incapable of forming tablets. In contrast, hardnesses of up to 9.6 lbf were achieved when reticulated cellulose was used as an agglomerate of the clay fines. But, as seen in Run 3, the hardness achieved for particles agglomerated with water alone was less than with the use of reticulated cellulose.

Hardness of the agglomerated product was greatest when using a Waring blender to blend an aqueous mixture of clay and reticulated cellulose. The hardness measure indicates that particles agglomerated with reticulated cellulose had comparable integrity as uncomminuted particles of clay.

The use of reticulated cellulose as an agglomerating agent, even at relatively low levels of about 5 to 10 weight percent, results in a large percentage of agglomerated particles having an effective particle size of greater than about 250 microns, as shown in Table I. In general, the more bacterial cellulose was introduced, the more agglomerated particles had an effective particle size of greater than about 250 microns.

Table I also shows that, for a given method of mixing, the proportion of dust-sized particles was decreased when as little as 0.5 wt. percent of reticulated cellulose was added. At 15.0 wt. percent reticulated cellulose, similar particle distributions were achieved regardless of the mixing method used. But, at lower reticulated cellulose levels, more of the desired large sized particles were obtained when a Waring blender was used. The improvement in particle size distribution can also be seen in FIG. 1. This figure illustrates that when clay particles are agglomerated with reticulated cellulose, there are far fewer undersized particles than in batches of untreated clay particles or those treated with water alone.

EXAMPLE 3

Comparative Agglomeration of Clay

The effectiveness of unbleached kraft pulp and BAC were compared in agglomerating calcined clay fines. Wood pulp and BAC were tested under substantially parallel conditions at a level of 15%. Additionally, a control sample was prepared without using an agglomerating agent.

For the Kraft pulp sample, 24.31 gm (5.25 gm. dry wt.) unbleached kraft pulp was slurried into 500 gm water and stirred for 20 minutes to disperse the pulp. Calcined clay dust having a size distribution similar to that shown in FIG. 1 was obtained from Edward Lowe Industries of Maricopa, Calif., and 29.75 gm calcined clay dust was added to the wood pulp slurry and mixed. The blend was then filtered using Buchner funnel. The filter cake was placed between blotter paper and further dewatered using a hand platen press. The pressed filter cake was over dried at 120° for 4 hours or air dried. The dried filter cake was ground with a Wiley mill equipped with a 6 mm screen. The size distribution of the particulates was measured on standard Tyler screens and is shown below in Table II.

The BAC sample was similarly prepared and tested. Reticulated bacterial cellulose prepared substantially as described in Example 1 was added in an amount of 91.3 gm (5.25 gm dry wt.) to 1.1 kg water having 29.75 gm calcined clay dust mixed therein, and the blend was stirred for 15 minutes. Filtration, dewatering, drying, grinding and sizing were performed as described above for the wood pulp sample.

A control was provided by mixing 29.75 gm. calcined clay dust in 500 ml of water and filtering with a Buchner funnel. The filter cake was air dried and ground as described above. The size distribution of particles was measured using standard Tyler screens.

TABLE II

| Particle Size (μm) | Size Distribution of Agglomerates Particle Size Distribution (%) | | |
|---|---|---|---|
| | 15% BAC | 15% Wood Pulp | Clay Only |
| >500 | 62.8 | 35.0 | 6.7 |
| 250 | 13.5 | 17.9 | 25.7 |
| 150 | 9.2 | 15.9 | 23.2 |
| 106 | 3.5 | 9.0 | 17.8 |
| 75 | 4.2 | 10.8 | 17.7 |
| 45 | 3.5 | 8.4 | 8.0 |
| <45 | 3.5 | 3.1 | 0.9 |

The results shown in Table 3 demonstrate that agglomeration of clay fines using 15% BAC results in a significant increase in the number of large particles (>500 μm) compared to agglomeration using wood pulp. Moreover, although there is some indication that the distribution of fines treated with wood pulp shifted to a larger particle size, qualitative observations indicated that the majority of the pulp/clay material that did not pass through the 500 μm screen was not "particulate." The wood pulp and clay material formed fluffy, fibrous aggregations of wood pulp fibers dusted with fines. The wood pulp and clay fines were not well integrated clay/pulp particulates. Qualitative observations therefore confirmed that wood pulp is not effective to agglomerate clay fines into particles that have structural or physical integrity. In contrast, BAC effectively agglomerated clay fines into particulates having a satisfactory particle size (>500 μm) and a high degree of structural integrity.

EXAMPLE 4

Agglomeration of Flyash

This example demonstrates the ability of BAC to agglomerate flyash material into a form that can be easily handled. Flyash is a combustion by-product from burning wood debris (source—Weyerhaeuser's Klamath Falls, Oreg. facility). Flyash used for experimental purposes had a large percentage of fines having an effective particle size of less than about 150 microns.

The flyash was mixed with 1, 5, 10% BAC on a dry basis based on flyash dry weight. In addition to the water contained in the BAC, an additional amount of water was added equal to twice the flyash weight. The BAC in original form was from 0.5 to 2.0% solids. The material was mixed either with a Waring blender for 5 minutes or with hand mixing until thoroughly mixed. The resultant material was dewatered by filtering under low vacuum, and the cake dried for 12-18 hours at 105° C. A control sample of flyash was treated in a similar fashion with water only.

Figure 2:
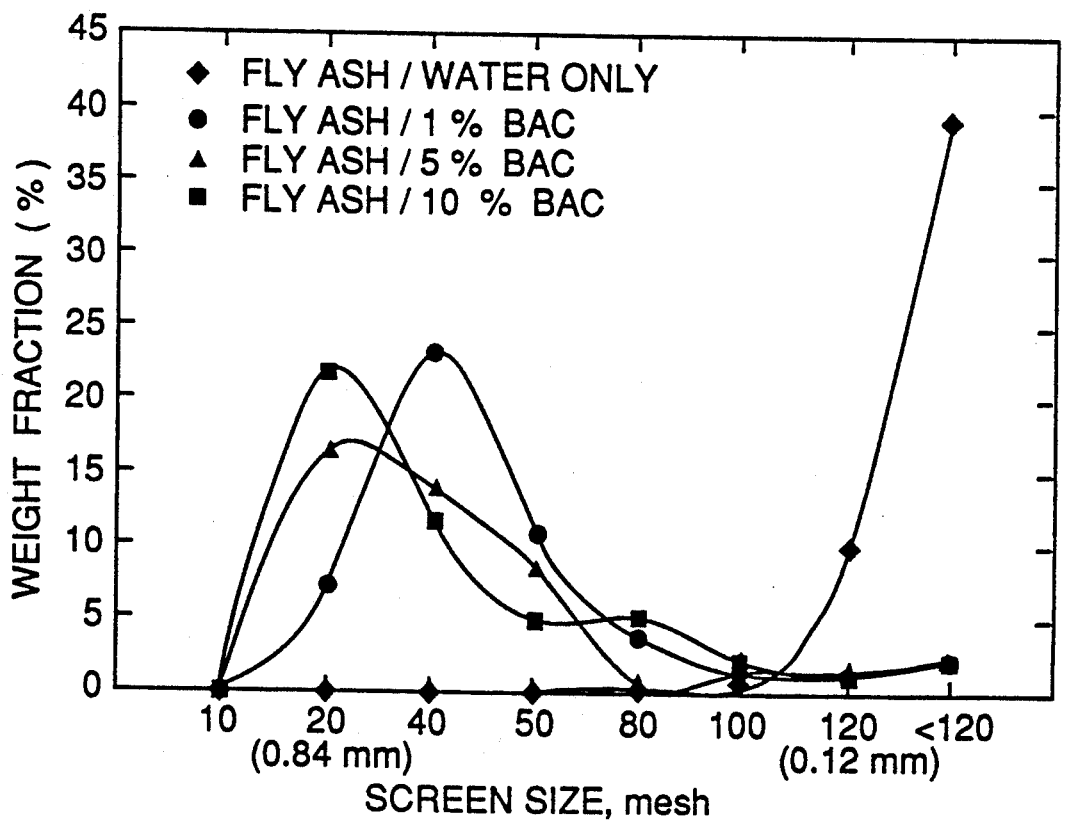
FIG. 2 is a graph showing the particle size distribution of flyash treated with three levels of BAC versus untreated flyash.

The dried cake was ground in a Wiley mill using a 4 mm screen. The samples were sized using standard testing sieves from 10 to 120 screen mesh. The results, shown in FIG. 2, indicate a greater number of larger sized particles in the BAC containing samples. The untreated flyash did not contain any appreciable amount of particles greater than 100 mesh corresponding to an effective particle size of about 150 microns.

EXAMPLE 5

Comparative Agglomeration of Flyash

The effectiveness of unbleached kraft pulp and BAC were compared in agglomerating fly ash. Fly ash was obtained from Weyerhaeuser's Klamath Falls, Oreg. facility, as described in Example 4. For the wood pulp sample, unbleached kraft pulp was refined in a Valley Beater until the Canadian Standard Freeness was 132. Samples were prepared by slurrying 1 and 10 grams dry weight pulp or BAC with sufficient fly ash to achieve a total dry solids weight of 100 grams (1% and 10% pulp and 10% BAC) in 400 grams water. A control sample was also prepared by blending 100 gm fly ash in water. The slurry was mixed for five minutes in a blender, and filtered through shark skin paper in a Buchner funnel. The filter cake was oven dried at 105° C. for 12 hours. The dried filter cake was ground with a Wiley mill equipped with a 4 mm screen. The size distribution was determined using standard Tyler screens.

The results of this experiment demonstrate an apparent shift to larger particle sizes for fly ash agglomerated with both wood pulp and BAC. Visual inspection of the agglomerated material, however, revealed that the fly ash agglomerated with wood pulp was in the form of fluffy, fibrous material resembling small cotton balls. The fly ash was dispersed throughout the fibrous pulp, but particulates having structural and physical integrity were not formed. In contrast, agglomeration of fly ash using BAC resulted in the formation of hard particles throughout the size distribution range.

EXAMPLE 6

Agglomeration of Carbon Black

This example demonstrates the use of BAC to agglomerate carbon black (Monarch 1400, Cabot Corporation) into a form that can be more easily handled. Carbon black has a large percentage of fines having an effective particle size of less than about 150 microns. The agglomeration of carbon black with BAC eliminates the handling problem of airborne carbon black dust when mixing the carbon black with other materials.

Twenty (20) grams of carbon black were mixed with BAC in 200 to 400 mL of water containing 1 mL surfactant (Tetronic 304, BASF Corporation) at 1,5 and 10% BAC based on carbon black weight. The original BAC was from 0.5 to 4.0% solids. The carbon/BAC material was mixed with a paddle stirrer for 5 minutes. The resultant material was dewatered by filtering under low vacuum, and the cake dried for 18-24 hours at 105° C. A control sample of carbon black was treated in a similar fashion with water only.

Figure 3:
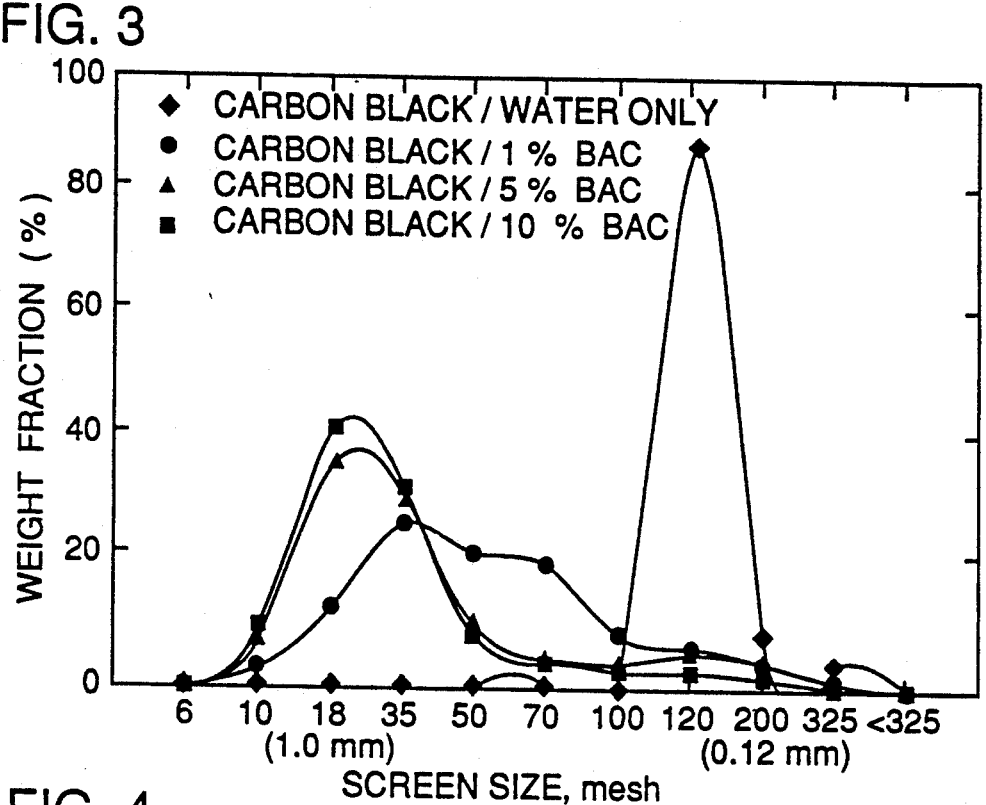
FIG. 3 is a graph showing the particle size distribution of carbon black treated with three levels of BAC as compared to untreated carbon black.

The dried cake was ground in a Wiley mill using a 6 mm screen. The samples were sized using standard testing sieves from 6 to 325 screen mesh. The results are shown in FIG. 3, and in the following Table II. They indicate that the majority of the carbon black with BAC has been bound into considerably larger particles than samples without BAC, with very little material left at the original particle size of 100 mesh, corresponding to effective particle sizes of about 150 microns or less. In fact, using BAC as an agglomerating agent results in agglomerated particles having a particle size of about 35 mesh, corresponding to effective particle sizes greater than about 450 microns.

TABLE III

Particle Size Distribution - Carbon Black

| Screen Size | Particle Size Distribution[1] | | | |
|---|---|---|---|---|
| | 10% BAC | 5% BAC | 1% BAC | Control |
| 6 | 0.1 | 0.1 | 0.0 | 0.0 |
| 10 | 8.8 | 7.2 | 2.8 | 0.0 |
| 18 | 41.0 | 35.3 | 12.1 | 0.0 |
| 35 | 31.0 | 29.3 | 25.3 | 0.0 |
| 50 | 8.1 | 9.6 | 20.7 | 0.0 |
| 70 | 3.9 | 4.6 | 19.1 | 0.0 |
| 100 | 2.6 | 3.6 | 8.1 | 0.0 |
| 120 | 2.6 | 5.3 | 6.1 | 87.4 |
| 200 | 1.5 | 3.9 | 4.1 | 8.3 |
| 325 | 0.4 | 1.0 | 1.3 | 3.8 |
| <325 | 0.6 | 0.1 | 0.4 | 0.5 |

[1]Percent particle size at respective BAC concentrations and control.

EXAMPLE 7

Use of Dried BAC to Bind Clay Fines

One of the conditions of using BAC in most cases, as an agglomeration agent, is that the BAC must be used in a wet form. This can present problems in some processes because of the need to have a dry agglomerating material in the initial mixing step. In this example, BAC was dried before use as a binder. BAC was dried by two different methods. In the first, wet BAC was slurried with carboxymethyl cellulose (CMC) from Hercules, grade CMC 7L in the ratio of 80% BAC, 20% CMC. The second method involved slurrying BAC with sucrose in a 1 to 1 ratio. In both processes the materials were dried as a sheet at 85° C. for 18 to 24 hours. The resultant dried sheet was then ground using a Wiley mill with a 0.5 mm screen.

Figure 4:
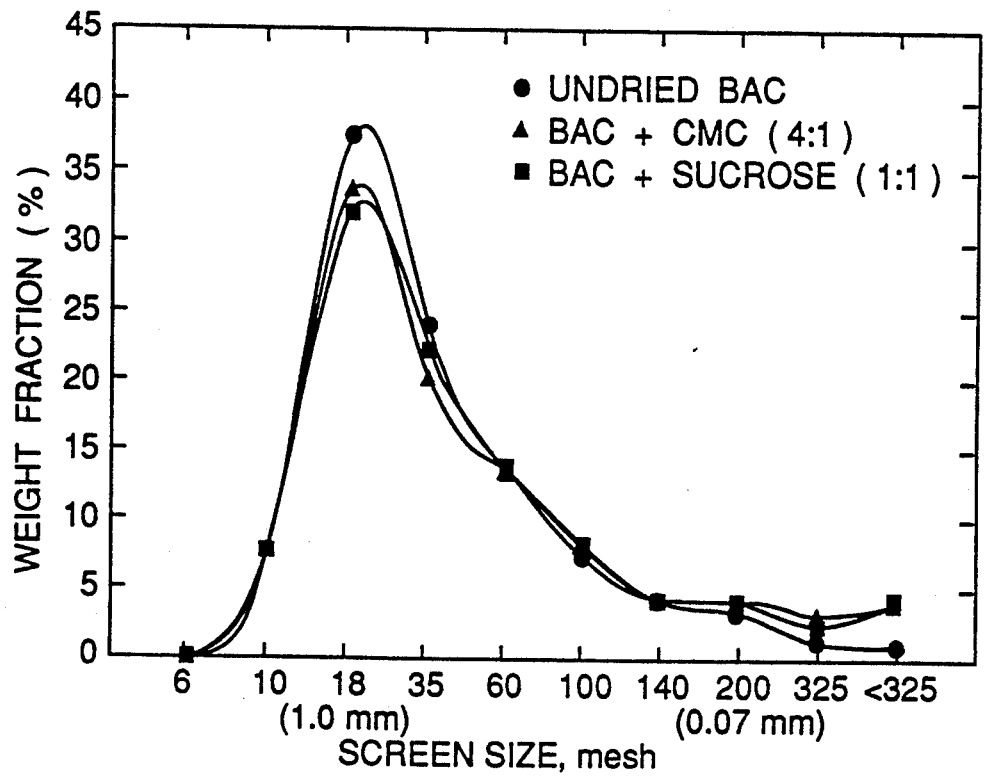
FIG. 4 is a graph showing the use of BAC dried with either carboxymethyl cellulose or sucrose in agglomerating clay fines.

In the agglomeration process, the dried powder was mixed with clay fines from Maricopa, Calif., using a Hobart mixer and a wire whip spindle to yield a composite containing 3% BAC. In a Waring blender, 25 g of the composite were mixed with 400 mL water at a high setting for 2 minutes. This was filtered to remove excess water, pressed into a cake and dried in an oven for 12 hrs at 105° C. The dried material was ground in a Wiley mill using a 6 mm screen, and the particle size distribution determined using standard testing sieves of 6 to 325 screen mesh. The results are shown in FIG. 4. The control material was made using undried BAC. As can be seen, the dried BAC produced about the same degree of agglomeration as the undried BAC.

EXAMPLE 8

Liquid Absorbency

It has been found that particles of a variety of sizes can be treated with reticulated cellulose to increase liquid absorbency. This applies not only to fine particles which are agglomerated with reticulated cellulose, but also to larger, nonagglomerated particles. Particles agglomerated or treated with BAC exhibit exceptionally good absorbency properties for non-aqueous liquids.

Figure 5:
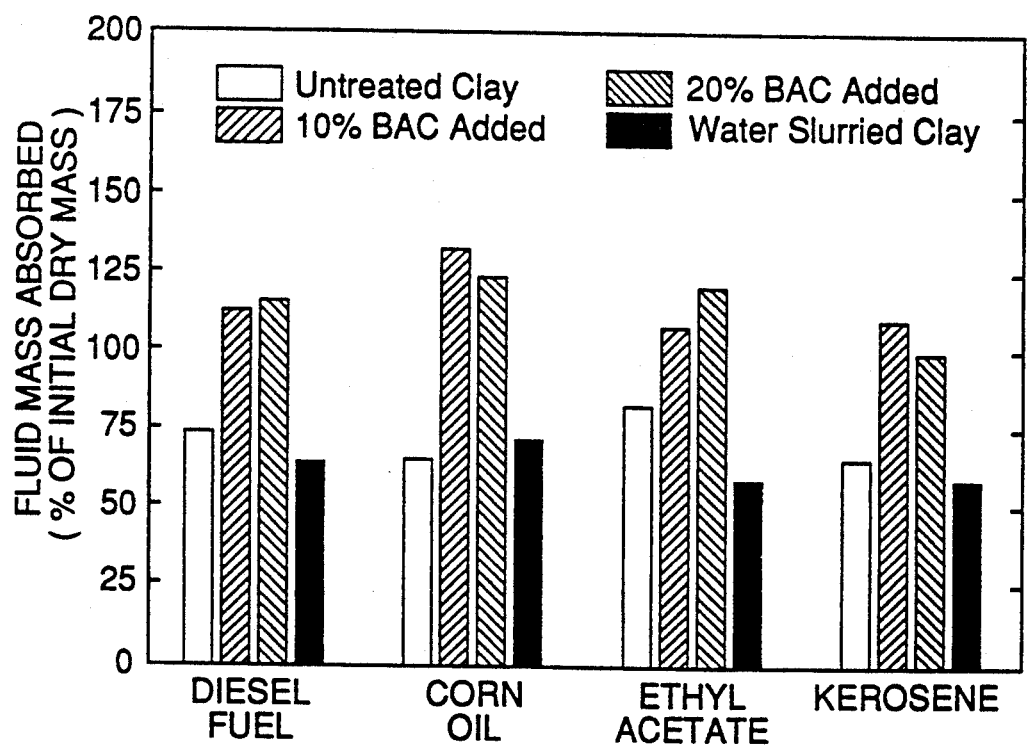
FIG. 5 is a graph showing the fluid absorbencies of untreated clay particles and of comparable clay particles that had been treated with water only or treated with BAC.

FIG. 5 illustrates that substantial increases in absorbency can be achieved if sufficient reticulated cellulose is used to treat clay particles. This is significant since clay animal litter must have a liquid absorption capacity for its intended function and is frequently used in the clean up of automotive oil spills and other fluid spills.

The data for FIG. 5 was obtained from two clay/reticulated cellulose mixtures. One contained 10 wt. percent reticulated cellulose, the other 20%. The clay (150 g oven dry basis), calcined clay from Edward Lowe Industries, Inc. of Paris, Tenn., was slurried with reticulated cellulose (15 g or 30 g oven dry basis) in two liters of water. A third sample, used as a control, was prepared by slurrying only clay, i.e., no reticulated cellulose was added.

Each slurry was mixed for 1.5 hours and filtered. The filter cakes were dried at 105° C. overnight and then broken into small pieces. These These three samples and a fourth sample of the clay (used as received) were conditioned at 50% relative humidity for 5-8 days. After conditioning, each sample was screened with a 10 mesh screen. The material which did not pass through the screen was reduced in a Wiley mill fitted with a 6 mm screen. The fractions were recombined for the absorbency tests.

The absorbency tests were conducted with 15 g samples suspended in screen baskets (60 mesh sides, 200 mesh bottoms). Tests with each of four fluids were conducted: kerosene, corn oil, and diesel fuel, and ethyl acetate. The samples were immersed in the fluid for ten minutes, removed and allowed to drain, and then weighed. Drainage time for the kerosene, corn oil, and diesel fuel was ten minutes and two minutes for the ethyl acetate. The calculation of absorption was based on conditioned weight of the sample.

Results of the tests are listed in Table IV.

TABLE IV

Reticulated Cellulose Function As Absorbent

| | Clay (as is) | Clay/ Reticulated Cellulose (90/10) | Clay/ Reticulated Cellulose (80/20) | Clay (slurried) |
|---|---|---|---|---|
| Solids Content (wt. percent) | — | 97.7 | 97.3 | 97.8 |
| Absorption (wt. percent, as is) | | | | |
| Diesel Fuel | 73.0 | 111.1 | 114.3 | 62.9 |
| Corn Oil | 64.8 | 131.7 | 122.0 | 70.9 |
| Ethyl Acetate | 81.7 | 106.4 | 119.5 | 58.6 |
| Kerosene | 65.0 | 108.6 | 98.9 | 58.8 |

Table IV shows that substantial increases in liquid absorbency are achieved when particles of a solid material are treated with reticulated cellulose.

EXAMPLE 9

Binding of Aluminum Oxide By BAC

This example demonstrates the use of BAC as a green strength binder for ceramic materials. A test ceramic material was made by making a slurry of 50% alumina (Alcoa A16 SG), 50% distilled water, and 1.5% Darvan C (as dispersant based on alumina). This alumina slurry was stirred for one hour. For the control samples, a 40% solution of Carbowax 20M, as a binder, was added in sufficient quantity to the alumina slurry to yield 4% binder based on the alumina content. For the BAC containing samples, sufficient BAC at 12% solids was added to the alumina slurry to yield binder levels of 0.5, 1.0, 2.0 and 4.0% based on the alumina content. All samples were air-dried for 24 hours at room temperature. The dried materials were ground with a mortar and pestle, and then screened through a 48 mesh sieve. Test slugs on each sample were made by pressing the powder in a die at 10,000 psi to give a disc that was 0.3 inches thick and an area of one square inch.

The samples were tested for strength by loading the discs biaxially in an Instron Universal Tester for diametral compression testing. The loading rate was 0.5 inch/min. The modulus of rupture (MOR) was calculated by the formula:

$$MOR = \frac{2P}{\pi Dt}$$

Where,
P = breaking load (pounds)
D = sample diameter (inches)
t = sample thickness (inches).

The results shown in the following Table V indicate a comparable strength at 0.5 to 1.0% BAC to the 4.0% Carbowax. Furthermore, higher levels of BAC yielded even greater green strength.

TABLE V

| Ceramic Disc Diametral Compression Test | | |
|---|---|---|
| Binder | Breaking Load (lbs) | Modulus of Rupture (psi) |
| 4% Carbowax (Control) | 17.3 | 31.5 |
| 0.5% BAC | 17.0 | 28.6 |
| 1.0% BAC | 21.0 | 34.9 |
| 2.0% BAC | 28.2 | 46.4 |
| 4.0% BAC | 41.7 | 66.6 |

Having illustrated and described preferred embodiments of our invention, it should be apparent to those skilled in the art that the invention permits modification in arrangement and detail. We claim as our invention all such modifications as come within the true spirit and scope of the following claims.

We claim:

1. An agglomerated particle comprising:
   (a) at least one non-cellulosic particle, and
   (b) at least one reticulated bacterial cellulose particle, wherein the agglomerated particle is larger than any of the non-cellulosic particles within the agglomerated particle.

2. A process for making an agglomerated particle comprising:
   mixing at least one non-cellulosic particle with at lease one reticulated bacterial cellulose particle, and
   allowing the particles to agglomerate, wherein the agglomerated particle is larger than any of the non-cellulosic particles within the agglomerated particle.

3. The product of claim 1 wherein the cellulose particle is produced from a strain of Acetobacter capable of producing reticulated bacterial cellulose under agitated culture conditions.

4. The product of claim 1, wherein the non-cellulosic particles are selected from the group consisting of organic and/or inorganic materials including clay, aluminum oxide, carbon black, and fly ash.

5. The process of claim 2 wherein the cellulose particle is produced from a strain of Acetobacter capable of producing reticulated bacterial cellulose under agitated culture conditions.

6. The process of claim 2 further comprising mixing non-cellulosic particle with reticulated bacterial cellulose in an aqueous slurry.

7. The process of claim 6 further comprising dewatering the mixture of fine particles and reticulated bacterial cellulose after mixing.

8. The process of claim 2 wherein the at least one non-cellulosic particle is selected from the group consisting of: organic and/or inorganic material, including clay, aluminum oxide, carbon black, and fly ash.

9. The process of claim 2 wherein the at least one non-cellulosic particle is a ceramic material and the cellulose serves as a green strength binder.

10. A process for increasing the liquid absorbency of particulates, comprising treating the particulates in a slurry containing reticulated bacterial cellulose and thereby producing treated particulates having enhanced liquid absorbency characteristics compared to the absorbency of untreated particulates.

11. The process of claim 10 wherein the cellulose is produced from a strain of Acetobacter capable of producing reticulated bacterial cellulose under agitated culture conditions.

12. The process of claim 10 further comprising dewatering the mixture of particulates and reticulated bacterial cellulose to produce the treated particulate product.

13. A treated particulate product comprising particles treated with a sufficient amount of reticulated bacterial cellulose to increase the liquid absorbency of the treated particulate product compared to the liquid absorbency of untreated particles.

14. The product of claim 13 wherein the cellulose is produced from a strain of Acetobacter capable of producing bacterial cellulose under agitated culture conditions.

15. An agglomerated product according to claim 1 that exhibits enhanced liquid absorbency properties compared to the liquid absorbency of the fine particles.

16. The product of claim 13, wherein the treated particulate product exhibits increased absorbency properties for non-aqueous liquids compared to those of untreated particles.

17. The product of claim 16, wherein the treated particulate product exhibits an increase in absorbency for non-aqueous liquids of at least about 30% compared to the absorbency for non-aqueous liquids of untreated particles.

18. An agglomerated product according to claim 1, wherein said fine particles have an effective particle size of less than about 250 microns and said agglomerated product comprises particles having an effective particle size of greater than about 250 microns.

19. An agglomerated product according to claim 18, wherein said agglomerated product comprises particles having a hardness of greater than about 9.0 lbf.

20. An agglomerated product comprising metal ore particles and associated fines admixed with bacterial cellulose to form an agglomerated product that is amenable to heap leaching techniques.

21. A process for enhancing the liquid permeation properties of metal ore particles and associated fines, comprising treating the metal ore particles and associated fines with reticulated cellulose and thereby producing treated metal ore particles and associated fines having enhanced liquid permeation properties over time compared to the liquid permeation properties of untreated metal ore particles and associated fines over time.

* * * * *